United States Patent [19]

Miller

[11] 4,126,203

[45] Nov. 21, 1978

[54] AIR-COUPLED SEISMIC DETECTOR

[75] Inventor: Dale E. Miller, Ponca City, Okla.

[73] Assignee: Continental Oil Company, Ponca City, Okla.

[21] Appl. No.: 661,064

[22] Filed: Feb. 25, 1976

[51] Int. Cl.² .................................................. G01V 1/16
[52] U.S. Cl. ..................................... 181/109; 181/122; 181/401; 73/627; 340/15.5 R
[58] Field of Search ......................... 181/109, 401, 122; 73/67, 522, 69, 70, 627; 340/15, 17, 258 D, 261; 324/4; 179/1 VE

[56] References Cited

U.S. PATENT DOCUMENTS

| 3,430,233 | 2/1969 | Christensson | 343/6 R |
| 3,514,749 | 5/1970 | Padberg, Jr. | 181/109 |
| 3,564,493 | 2/1971 | Hicklin | 340/15 |
| 3,934,219 | 1/1976 | Monaghan | 340/15 |

OTHER PUBLICATIONS

"Airblast waves from contained underground explosions," Reed, Sandia Laboratories Research Report, Dec. 1971.

"Acoustic calculation of ground-induced-schock air blast," Cole, Jr., Sandia Laboratories Research Report, Nov. 1970.

Primary Examiner—Howard A. Birmiel
Attorney, Agent, or Firm—William J. Miller

[57] ABSTRACT

A method and apparatus for improved detection of reflected seismic energy through detection of air pressure variations in air above an air/earth surface interface. One form of apparatus suitable for detection in air of seismic energy waves emanating from beneath the earth surface consists of supporting a collecting reflecting member over a designated earth surface site and detecting air pressure variations at a focal point within the reflector member; and, thereafter, transmitting or conducting the reflected seismic energy indications for processing in accordance with the seismic energy source requirements to obtain seismic energy reflection data for the particular locale.

12 Claims, 4 Drawing Figures

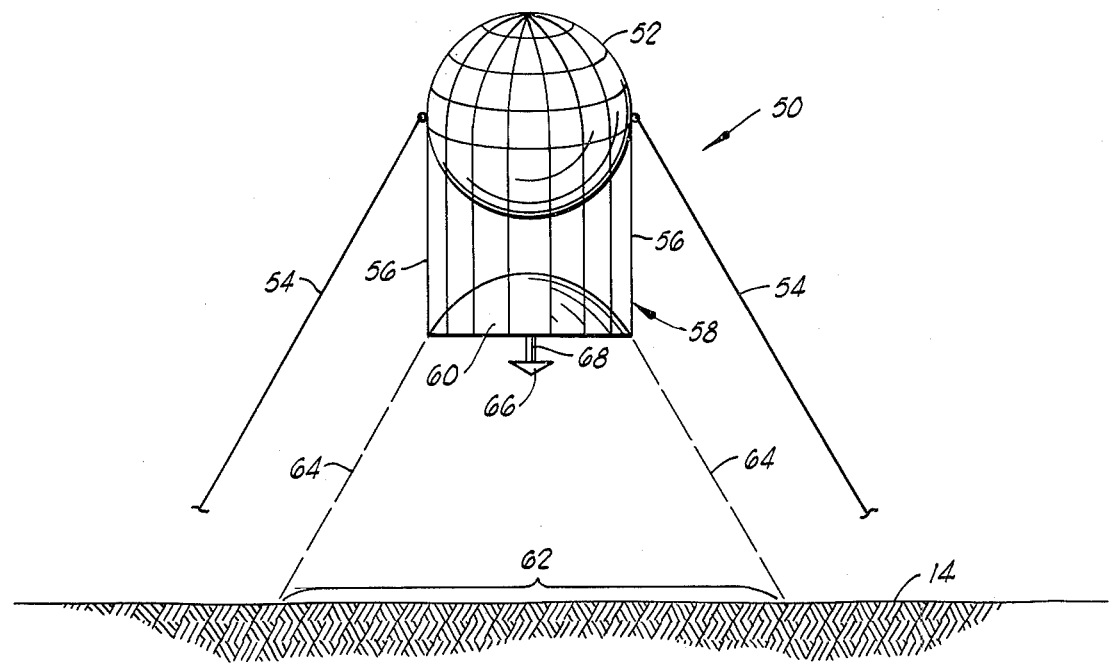
FIG. 2
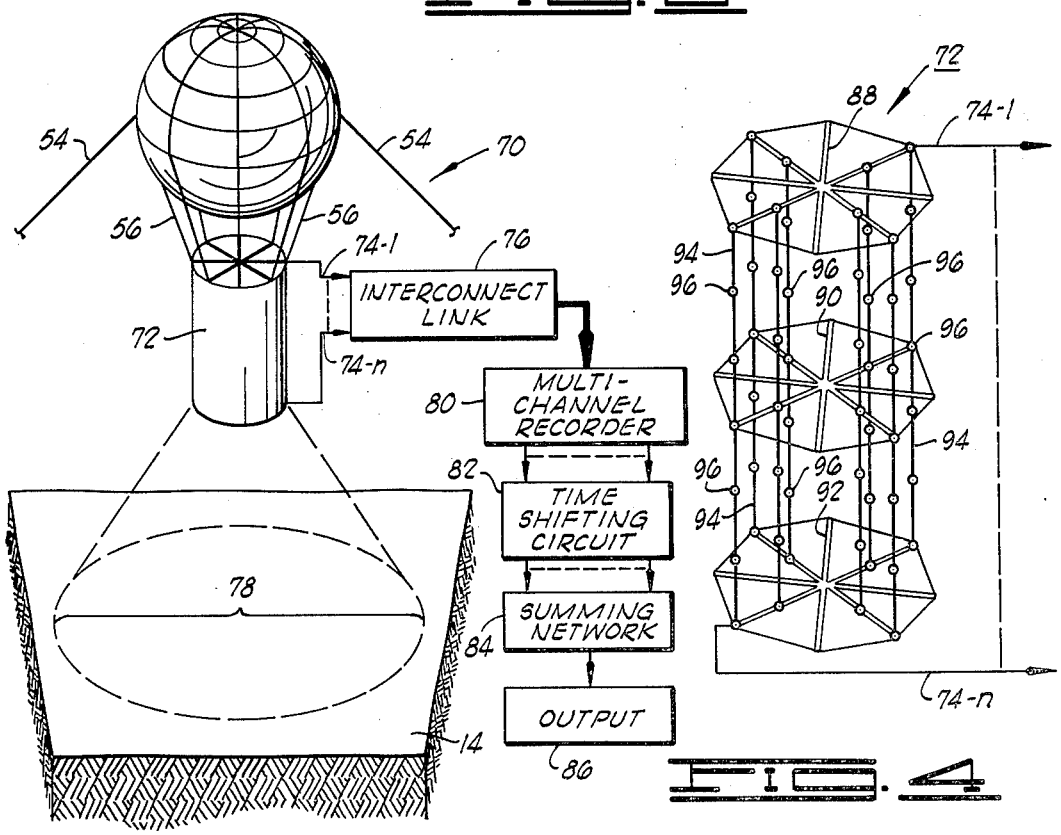
FIG. 3
FIG. 4

AIR-COUPLED SEISMIC DETECTOR

BACKGROUND OF THE INVENTION

1. Field of the Invention

The invention relates generally to seismic energy detection and, more particularly, but not by way of limitation, it relates to a method and apparatus for detecting subsurface seismic energy propagation in air above the earth's surface.

2. Description of the Prior Art

While there are numerous types of seismic energy detectors utilized in contact with earth, either singly or in grouped arrays, for the purpose of detecting subterranean seismic energy emanations, the applicant knows of no prior art device which detects seismic energy through air coupling of the earth surface to a pressure responsive device. There are prior teachings of airborne seismic detectors, but these are directed to transport via helicopter, other aircraft or parachute for dropping and earth-coupling contact at a designated earth site. To applicant's knowledge, the concept of seismic energy detection through focusing and sensing air pressure variations at a point above the earth surface has not been heretofore utilized.

SUMMARY OF THE INVENTION

The present invention contemplates a method and apparatus wherein subterranean seismic energy emanations are detected by means of one or more air pressure responsive devices to provide a detection output signal for further processing. Such an air-coupled detection device may be utilized with any of various types of seismic energy source or earth input device to detect and process refracted and/or reflected seismic energy data for a particular shooting site.

Therefore, it is an object of the present invention to provide a method of seismic energy detection which functions above the earth surface and has the capability of enhancing desirable seismic wave data while being rapidly re-positionable along a line of survey.

It is yet another object of the present invention to provide a detection device which need not be in contact with or in proximity to the surface of the earth such that its detection capabilities are relatively independent of the surface cover or material, including snow, water, ice, mud, boulders, vegetation, etc.

It is still another object of the present invention to provide a method of air-coupled seismic detection having an effective area of detection which can be varied in size by changing the height of the point of detection and/or by changing the directional response, such that the effective rejection of seismic noise and interference can be made equivalent to that of a circular array of conventional geophones of any desired diameter.

It is also an object of the invention to provide an air-coupled seismic detection device wherein the effective aperture of detection, i.e. on the earth surface, increases with the height of the device such that a relatively small air-coupled detector can cover a large enough earth area to cancel apparent wave lengths which are appreciably greater than the dimensions of the above-ground detection device.

Finally, it is an object of the present invention to provide method and apparatus for subterranean seismic energy sounding which can provide enhancement of vertical energy components with diminishment of noise, interference and horizontal energy components.

Other objects and advantages of the invention will be evident from the following detailed description when read in conjunction with the accompanying drawings which illustrate the invention.

BRIEF DESCRIPTION OF THE DRAWINGS

FIG. 2 is a schematic form side elevation of an air-coupled seismic energy detector;

FIG. 3 is a perspective view, including block diagram of circuitry, of another form of air-coupled seismic energy detector as may be utilized in the present invention; and FIG. 4 is a schematic diagram of the seismic energy detector as depicted in FIG. 3.

DETAILED DESCRIPTION OF THE INVENTION

Figure 1:
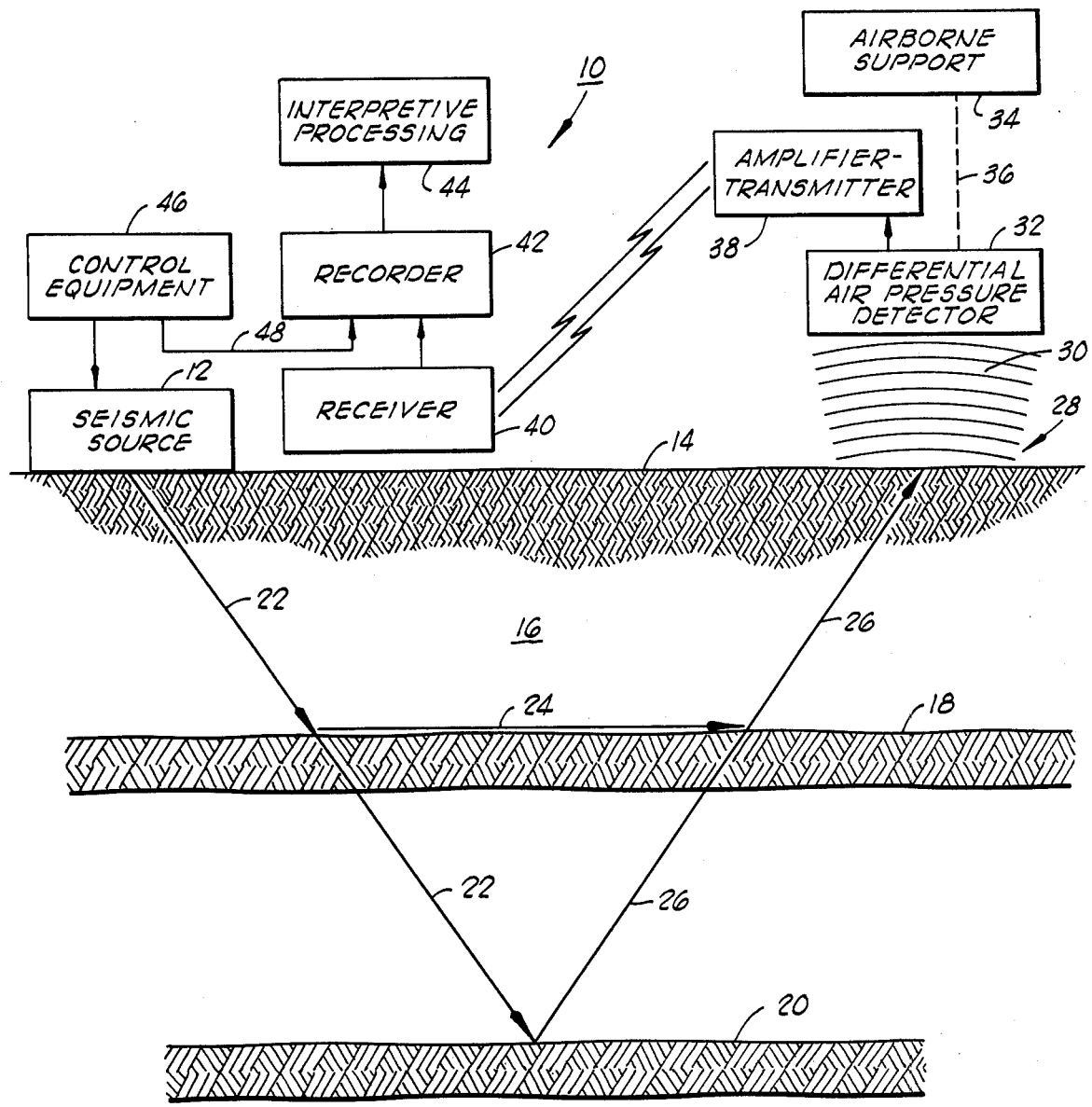
FIG. 1 is a schematic block diagram of a seismic energy detection system constructed in accordance with the present invention.

FIG. 1 illustrates a seismic system 10 having a seismic source 12 disposed to impart input seismic energy through the earths surface 14 into earth 16 for subsequent refraction, reflection and detection thereby to provide distinctive lithological data for geological interpretation. Earth 16 is shown as including a first substratum 18 and a second or deeper substratum 20, and it is noted that seismic energy waves emanating along ray path 22 are refracted along substratum 18 via ray path 24 with subsequent return to the surface via ray path 26, while energy along ray path 22 is also reflected from the interface of substratum 20 for surface return along ray path 26. While the seismic energy propagation is illustrated in simplified ray form, it is well understood by those skilled in the art that the seismic wave propagation is of a spherical character and omni-directional as from its initial point source or seismic source 12.

Seismic energy propagating along ray path 26 intersects earth surface 14 within a pre-designated earth aperture 28 whereupon the energy is coupled upward in the form of air pressure waves 30. The air pressure waves 30 are then detected by an air pressure detector 32 which includes collecting and/or focusing structure as will be further described below. The air pressure detector 32 is suitably supported by an airborne support 34 by means of a supporting link 36. The airborne support 34 may be any suitable device such as a tethered balloon, dirigible, hover aircraft or the like. The air pressure detector 32 may be any of various commercially available pressure-measuring elements. For example, while conventional surface energy detectors require measurement of vertical particle velocities as small as $10^{-4}$ cm/sec., the amplitude of the resulting pressure waves 30 in air are in the range of $10^{-3}$ to $10^{-2}$ dynes/cm$^2$ which can be easily detected by commercially available pressure responsive transducers.

The detected pressure variations in the form of electrical output may then be transmitted or conducted to a surface location for further recording, processing and the like. In FIG. 1, the output electrical signal or signals from air pressure detector 32 are applied to a conventional form of amplifier-transmitter 38 which then transmits utilizing telemetric modes to a ground receiver 40. Ground receiver 40 then pre-amplifies the received signal for output to a conventional form of field recorder 42 wherein the seismic data is available for further interpretive processing in stages 44. Control equipment 46 provides basic signal generation and control for seismic source 12 and, in the event that vibratory or similar seismic energy input is utilized, a replica control signal may be applied to control equipment 46 via lead 48 to the recorder 42. This then enables subsequent received signal processing which includes normalization, correlation and other well-known techniques which provide optimum presentation of the finally processed seismic data.

FIG. 2 illustrates one form of air pressure detector 50 which may be utilized in the present invention. In this case, airborne support is provided by a balloon 52 maintained in proper position by means of a requisite one or more tethering ropes 54 which may be controllable from earth surface 14, by truck-mounted winch or the like, to maintain and adjust position of balloon 52. A plurality of hanger ropes 56 are then affixed about the horizontal circumfery of balloon 52 and attached at the lower end to suspend seismic detector 58 in desired attitude.

Seismic detector 58 is a parabolic acoustic energy reflector 60 as may be constructed of any lightweight, rigid, acoustically reflective material such as aluminum or fiber glass, and it is suspended to open downward thereby to define an effective aperture 62 as defined by the paraboloid extention lines 64. Thus, it may be noted that the effective aperture 62 or area of energy detection may be adjusted as desired, and as dictated by frequency response, in accordance with raising or lowering of balloon 52 and suspended seismic detector 58.

A pressure detecting sensor 66 is suspended by means of a support bar 68 to be positioned in the focal point of reflector 60 in such a manner that it is responsive to all pressure variations emanating from aperture 62. The pressure-detecting sensor 66 may be any device or cluster of devices which is sufficiently sensitive in the seismic band of frequencies, preferably from 5 Hertz to 500 Hertz, and is capable of providing a few microvolts output for the pressure variations in the ranges of $10^{-3}$ to $10^{-2}$ dynes/cm$^2$.

The diameter across the lower or open end of reflector 60 may vary from a few meters up to tens of meters, depending upon the degree of directionality, i.e., the effective cone of detection, which is desired for a particular band of frequencies. The lower the frequencies, the longer the wave length and the greater the diameter necessary to obtain a given directionality.

FIGS. 3 and 4 illustrate an alternative form of aircoupled seismic detector 70 which also may be supported by such as a balloon 52, tethering ropes 54 and hanger rope 56. The detector 70 is shown as a cylindrical body 72 which is adapted to contain a multitude of individual pressure detection elements or sensors as disposed in predetermined manner throughout the volume of space, as will be further described below. Outputs from each of the individual sensors is then provided by the plurality of conductors 74-1 through 74-n to a suitable interconnect link 76 providing transmission to the surface or other central processing point, e.g., amplifier transmitter 38 and receiver 40 as shown in FIG. 1. The number and spacing of individual paressure sensors depends upon the size of the array and the detector spacing which will be required for adequate sampling of the seismic frequencies of interest. Thus, as shown in FIG. 3, spacing of pressure sensors uniformly throughout the volume of a vertical cylinder will allow a uniform response for all horizontal directions which, in turn, can be focused in the vertical direction by means of time-shifting and summation of output signals, as will be described. Such focusing in the vertical direction will then adjust or define the vertical cone of detection describing the effective aperture 78 on earth surface 14. The diameter of effective aperture 78 can be adjusted both by raising and lowering cylindrical array 72 and by time shift adjustment for summation of the plurality of spaced pressure sensors within cylindrical detector 72.

Outputs from each of the individual pressure sensors are then conducted through interconnect link 76 for input to a multi-channel recorder 80. The recorder 80 may be a conventional multi-channel geophysical recorder which can be controlled to provide input to time shifting circuit 82 in accordance with the desired response pattern to be emulated whereupon summation of output time-shifting signals in summing network 84 will provide desired output 86 for recording and further processing, including such as the correlation procedures. It is contemplated that the most flexible method for handling the data from a large plurality of individual pressure sensors is to record all individual detector signals for subsequent input to a computer for processing to gain the desired directional response.

FIG. 4 illustrates one form of plural pressure sensor, cylindrical array structure. The cylindrical array 72 may be maintained by utilization of a plurality of horizontally rigid frameworks, equi-spaced radial bar members 88, 90 and 92 as supported in vertical spacing by a plurality of rope or hanger members 94. A large plurality of pressure sensors 96 are then arrayed along hanger members 94 in pre-designated spacing as selected in accordance with desired frequency response and diameter of effective aperture.

Each of the individual pressure sensors 96 provides output electrical connection by its respective lead 74-1 through 74-n to interconnect link 76 and subsequent processing. Thus, while the pressure detector 58 of FIG. 2 has the advantage of requiring only one individual pressure sensor element, the pressure detector 72 of FIGS. 3 and 4 permits the application of more flexible data processing schemes and has the mechanical advantages of lighter weight, less wind resistance, and easier breakdown for transportation and storage.

The foregoing discloses a novel method and apparatus for detecting earth propagated seismic energy in air at a selected distance above an effective aperture of the earth's surface. For a given detection apparatus at a fixed height, the size and the effect of the detection has the further desirable property of decreasing with frequency since directionality will increase with frequency. It is further to be found that the ratio of seismic energy reflected wave amplitude relative to the amplitude of noise and/or interference will be greater at points above the earth's surface than at points on the surface. This occurs because the reflection wave fronts are nearly plane when they reach the surface. Consequently, the geometrical attenuation i.e., spherical spreading, is relatively small and the amplitude will decrease slowly with height above the earth's surface. On the other hand, surface waves, refractions, and wind noise represent more localized pressure sources and the resulting spherical spreading will cause relatively rapid attenuation with height, especially for the first tens of meters.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method of seismic surveying over a designated earth surface area, comprising the steps of:
   generating seismic energy input to the earth from a seismic source located at a first earth surface position;
   detecting the vertical component of subsurface reflected seismic energy at a second pre-selected earth surface position by detecting the air pressure variations immediately thereabove;
   repeating said steps of generating and detecting for other pre-selected positions of said earth surface that are related in proximity and directionally to said first and second earth surface positions; and
   processing the detected seismic energy to derive output indication for interpretive use.

2. A method as set forth in claim 1 wherein said step of detecting further comprises:
   suspending from an airborne member an energy reflective structure having the property of focusing air pressure emanating from a larger area of earth surface; and
   detecting the pressure variations of the air pressure at the point of focus.

3. A method as set forth in claim 1 wherein said step of detecting further comprises:
   suspending from an airborne member a plurality of vertical rows of pressure detectors having pre-set equal spacing between vertically adjacent detectors as well as between rows of detectors to detect pressure variations over a larger surface area and provide augmented detected indication.

4. A method as set forth in claim 3 wherein said equal spacing between vertically adjacent detectors and rows of detectors is related to a selected range of acoustic energy frequencies.

5. A method as set forth in claim 4 wherein said frequency range is selected for seismic energy reflections in the range of 5 to 80 Hertz.

6. A method as set forth in claim 4 wherein said frequency range is selected for seismic energy reflections in the range of 5 to 500 Hertz.

7. A method as set forth in claim 3 wherein said plurality of vertical rows comprises:
   a three dimensional array of plural, radially aligned rows of vertically equi-spaced pressure detectors.

8. A method as set forth in claim 2 wherein:
   said energy reflective structure is a parabola of revolution and the pressure variations are detected at the focus of the parabola.

9. A method as set forth in claim 1 which is further characterized to include steps of:
   tethering said airborne member stationarily at each selected earth surface position to enable progressive movement of the airborne member along a designated surface line of survey pattern.

10. Apparatus for seismic surveying over a designated earth surface area, comprising:
    a seismic source coupled to the earth surface for periodic energization to generate seismic energy for propagation into the earth subsurface;
    pressure detection means stationarily suspended over a selected earth surface position for detection of the vertical component of reflected seismic energy emanating from said earth subsurface;
    means for transmitting detected reflected seismic energy indications from said pressure detection means; and
    means at a selected earth surface position for receiving said seismic energy indications and providing an output data indication for seismic interpretation.

11. Apparatus as set forth in claim 10 wherein said pressure detection means comprises:
    a parabolic reflector suspended to open downward toward said earth medium surface; and
    means for detecting pressure variations supported at the focus of said parabolic reflector.

12. Apparatus as set forth in claim 10 wherein said pressure detecting means comprises:
    an elongated vertical cylinder defined by plural, radial arrays of vertical rows of equi-spaced air pressure detectors; and
    means for summation of detected energy indications for all pressure detectors in accordance with time shifting which relates to the wave length of a selected range of acoustic energy to provide optimum augmentation of pressure variation indications.

* * * * *